(12) United States Patent
Farre Guiu et al.

(10) Patent No.: US 11,523,186 B2
(45) Date of Patent: Dec. 6, 2022

(54) AUTOMATED AUDIO MAPPING USING AN ARTIFICIAL NEURAL NETWORK

(71) Applicant: Disney Enterprises, Inc., Burbank, CA (US)

(72) Inventors: Miquel Angel Farre Guiu, Bern (CH); Marc Junyent Martin, Barcelona (ES); Albert Aparicio Isarn, Barcelona (ES); Avner Swerdlow, Los Angeles, CA (US); Anthony M. Accardo, Los Angeles, CA (US); Bradley Drew Anderson, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 570 days.

(21) Appl. No.: 16/586,657

(22) Filed: Sep. 27, 2019

(65) Prior Publication Data
US 2021/0099760 A1    Apr. 1, 2021

(51) Int. Cl.
*G10L 25/81* (2013.01)
*H04N 21/466* (2011.01)
(Continued)

(52) U.S. Cl.
CPC ........... *H04N 21/4666* (2013.01); *G06N 3/08* (2013.01); *G10L 25/18* (2013.01); *G10L 25/30* (2013.01);
(Continued)

(58) Field of Classification Search
CPC .... H04N 21/00; H04N 21/466; H04N 21/439; G06N 3/00; G06N 3/08; G10L 25/00;
(Continued)

(56) References Cited

U.S. PATENT DOCUMENTS

| 5,548,595 A | * | 8/1996 | Hirayasu | ................ H04H 60/11 |
| | | | | 714/704 |
| 8,855,796 B2 | * | 10/2014 | Otsuka | ..................... G10H 1/00 |
| | | | | 700/94 |

(Continued)

OTHER PUBLICATIONS

D. FitzGerald, "Upmixing from mono—A source separation approach," 2011 17th International Conference on Digital Signal Processing (DSP), 2011, pp. 1-7, doi: 10.1109/ICDSP.2011.6004991. (Year: 2011).*

Heittola, Toni, et al. "Context-dependent sound event detection." EURASIP Journal on Audio, Speech, and Music Processing 2013.1 (2013): 1-13. (Year: 2013).*

(Continued)

*Primary Examiner* — Qi Han
(74) *Attorney, Agent, or Firm* — Farjami & Farjami LLP

(57) ABSTRACT

According to one implementation, an automated audio mapping system includes a computing platform having a hardware processor and a system memory storing an audio mapping software code including an artificial neural network (ANN) trained to identify multiple different audio content types. The hardware processor is configured to execute the audio mapping software code to receive content including multiple audio tracks, and to identify, without using the ANN, a first music track and a second music track of the multiple audio tracks. The hardware processor is further configured to execute the audio mapping software code to identify, using the ANN, the audio content type of each of the multiple audio tracks except the first music track and the second music track, and to output a mapped content file including the multiple audio tracks each assigned to a respective one predetermined audio channel based on its identified audio content type.

20 Claims, 4 Drawing Sheets

(51) Int. Cl.
*G10L 25/51* (2013.01)
*G10L 25/18* (2013.01)
*H04N 21/439* (2011.01)
*G06N 3/08* (2006.01)
*G10L 25/30* (2013.01)
*G06N 3/04* (2006.01)

(52) U.S. Cl.
CPC .............. *G10L 25/51* (2013.01); *G10L 25/81* (2013.01); *H04N 21/4394* (2013.01); *G06N 3/04* (2013.01)

(58) Field of Classification Search
CPC ......... G10L 25/81; G10L 25/03; G10L 25/18; G10L 25/27; G10L 25/30; G10L 25/39; G10L 25/51; G10L 25/78; G10L 25/84; G10L 21/003; G10L 21/00; G10L 21/0272; G10L 21/028; G10L 21/0308; G10L 21/038; G10L 21/055; G10L 21/14; G10L 21/18
USPC ................. 704/278, 276, 270, 270.1, 8, 257
See application file for complete search history.

(56) References Cited

U.S. PATENT DOCUMENTS

| | | | | |
|---|---|---|---|---|
| 11,205,445 | B1* | 12/2021 | Sharma | H04N 21/251 |
| 11,282,509 | B1* | 3/2022 | Li | G06F 16/65 |
| 2013/0254076 | A1* | 9/2013 | Thomas | G06Q 30/0631 |
| | | | | 705/27.1 |
| 2020/0160878 | A1* | 5/2020 | Heo | G10L 25/30 |
| 2020/0312350 | A1* | 10/2020 | Lim | G10L 25/51 |

OTHER PUBLICATIONS

Cano, Pedro & Batlle, Eloi & Mayer, Harald & Neuschmied, Helmut. (2009). Robust Sound Modeling for Song Detection in Broadcast Audio. (Year: 2009).*

Revay, Shauna, and Matthew Teschke. "Multiclass language identification using deep learning on spectral images of audio signals." arXiv preprint arXiv:1905.04348 (2019). (Year: 2019).*

Le, Nam, and Jean-Marc Odobez. "Learning multimodal temporal representation for dubbing detection in broadcast media." Proceedings of the 24th ACM international conference on multimedia. 2016. (Year: 2016).*

* cited by examiner

AUTOMATED AUDIO MAPPING USING AN ARTIFICIAL NEURAL NETWORK

BACKGROUND

Audio-visual content, such as movies, television programming, and broadcasts of sporting events, for example, is widely used to distribute entertainment to consumers. Due to its popularity with those consumers, ever more audio-visual content is being produced and made available for distribution via traditional broadcast models, as well as streaming to services. Consequently, the accuracy and efficiency with which audio-visual content can be reviewed, classified, archived, and managed has become increasingly important to producers, owners, and distributors of such content.

Effective management of audio-visual content includes the classification of audio tracks accompanying the video assets contained in an audio-visual file. However, conventional approaches to performing audio classification tend to be intensively manual, making those conventional processes relatively slow and costly. As a result, there is a need in the art for solutions enabling automation of the classification of audio tracks accompanying the video components of audio-visual content, in order to reduce the time and human involvement required for content classification and management.

SUMMARY

There are provided systems and methods for performing automated audio mapping using an artificial neural network, substantially as shown in and/or described in connection with at least one of the figures, and as set forth more completely in the claims.

DETAILED DESCRIPTION

Figure 1:
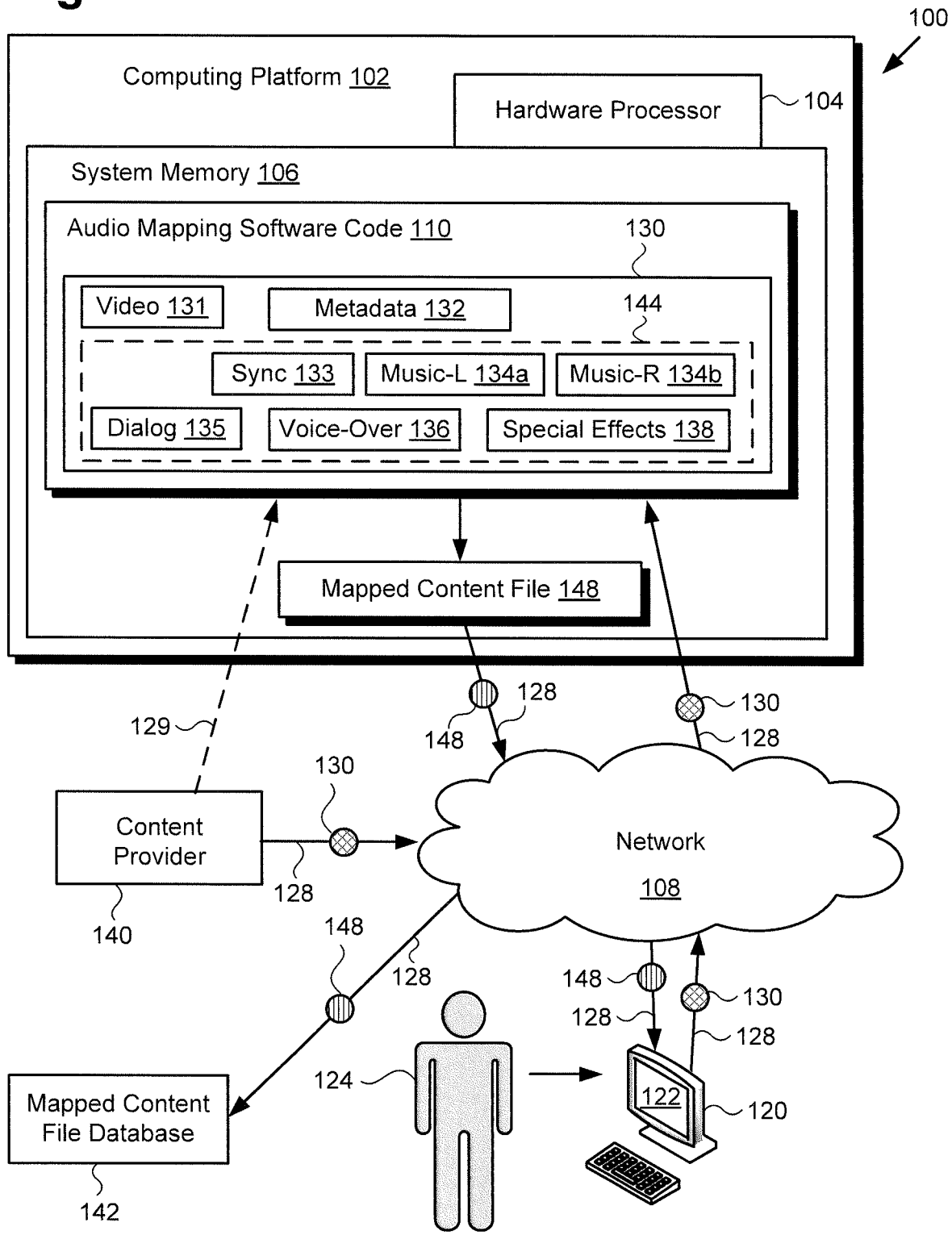
FIG. 1 shows a diagram of an exemplary system for performing automated audio mapping using an artificial neural network (ANN), according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses automated systems and methods for performing audio mapping using an artificial neural network that overcome the drawbacks and deficiencies in the conventional art. It is noted that, as used in the present application, the terms "automation," "automated", and "automating" refer to systems and processes that do not require the participation of a human user, such as a human operator. Although, in some implementations, a human operator may review the audio classifications performed by the automated systems and according to the automated methods described herein, that human involvement is optional. Thus, the methods described in the present application may be performed under the control of hardware processing components of the disclosed automated systems.

It is further noted that, as defined in the present application, an artificial neural network (hereinafter "ANN"), also known simply as a neural network (NN), is a type of machine learning framework in which patterns or learned representations of observed data are processed using highly connected computational layers that map the relationship between inputs and outputs. A "deep neural network," in the context of deep learning, may refer to a neural network that utilizes multiple hidden layers between input and output layers, which may allow for learning based on features not explicitly defined in raw data. "Online deep learning" may refer to a type of deep learning in which machine learning models are updated using incoming data streams, and are designed to progressively improve their performance of a specific task as new data is received and/or adapt to new patterns of a dynamic system. As such, various forms of ANNs may be used to make predictions about new data based on past examples or "training data." In various implementations, ANNs may be utilized to perform image processing or natural-language processing.

FIG. 1 shows a diagram of an exemplary system for performing automated audio mapping using an ANN, according to one implementation. As shown in FIG. 1, automated audio mapping system 100 includes computing platform 102 having hardware processor 104, and system memory 106 implemented as a non-transitory storage device. According to the present exemplary implementation, system memory 106 stores audio mapping software code 110.

As further shown in FIG. 1, automated audio mapping system 100 is implemented within a use environment including communication network 108, user system 120 including display 122, and user 124 utilizing user system 120. In addition, the exemplary use environment shown in FIG. 1 further includes content file or live stream 130 (hereinafter "content 130"), content file or live stream provider 140 (hereinafter "content provider 140"), mapped content file 148 corresponding to content 130 and produced using audio mapping software code 110, and mapped content file database 142. Also shown in FIG. 1 are network communication links 128 interactively connecting user system 120, content provider 140, and mapped content file database 142 with automated audio mapping system 100 via communication network 108.

Content 130 may take the form of an audio-visual file or live stream, for example, including video content 131, and metadata 132, as well as multiple audio tracks 144 each of which may include synchronization signals 133. As shown in FIG. 1, examples of audio tracks 144 may include respective left and right stereo music tracks 134a and 134b, dialog track 135, voice-over audio track 136, and audio special effects track 138. It is noted that the specific examples of audio tracks 144 depicted in FIG. 1 are merely exemplary. In some other implementations, one or more of left and right stereo music tracks 134a and 134b, dialog track 135, voice-over audio track 136, and audio special effects track 138 may be omitted from audio tracks 144. In yet other implementations, audio tracks 144 may include multiple instances of one or more of left and right stereo music tracks 134a and 134b, dialog track 135, voice-over audio track 136, and audio special effects track 138. That is to say, in some implementations, audio tracks 144 may include more than two music tracks 134a and 134b, and/or more than one dialog track 135, and/or more than one voice-over audio track 136, and/or more than one audio special effects track 138.

As known in the art, voice-over is an audio-visual content production technique in which a narrator, actor, or other voice talent who typically does not appear in the video component of the audio-visual content reads dialog from a script. Voice-over audio track 136 may be produced in a recording studio, for example, in isolation from the production of other audio tracks and video content 131. As a result, voice-over audio track 136 generally includes only the narration provided by the voice-over talent, interspersed with intervals of silence, but generally does not include background sounds such as environmental sounds, or voices of actors other than the voice-over talent.

By contrast to voice-over audio track 136, dialog track 135 may include the interaction of several voices in conversation, as well as non-vocal sounds produced during that conversation, such as background sounds including environmental sounds and/or sounds resulting from actions performed by the actors performing the dialog. Audio special effects track 138 may include one or more human sounds, or non-humanly produced sounds. For example, audio special effects track 138 may include one of more of background sounds, a laugh track, and applause.

It is noted that although automated audio mapping system 100 may receive content 130 from content provider 140 via communication network 108 and network communication links 128, in some implementations, content provider 140 may take the form of a content library integrated with computing platform 102, or may be in direct communication with automated audio mapping system 100 as shown by dashed communication link 129. Alternatively, in some implementations, content 130 including video content 131, metadata 132, left and right stereo music tracks 134a and 134b, dialog track 135, voice-over audio track 136, and audio special effects track 138 may be provided to automated audio mapping system 100 by user 124.

It is further noted that, although the present application refers to audio mapping software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1 depicts audio mapping software code 110 as being stored in its entirety in system memory 106, that representation is also provided merely as an aid to conceptual clarity. More generally, automated audio mapping system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within automated audio mapping system 100. Thus, it is to be understood that various features of audio mapping software code 110, such as one or more of the features described below by reference to FIG. 2, may be stored and/or executed using the distributed memory and/or processor resources of automated audio mapping system 100.

According to the implementation shown by FIG. 1, user 124 may utilize user system 120 to interact with automated audio mapping system 100 over communication network 108. In one such implementation, computing platform 102 may correspond to one or more web servers, accessible over a packet-switched network such as the Internet, for example. Alternatively, computing platform 102 may correspond to one or more computer servers supporting a wide area network (WAN), a local area network (LAN), or included in another type of limited distribution or private network.

Although user system 120 is shown as a desktop computer in FIG. 1, that representation is also provided merely as an example. More generally, user system 120 may be any suitable mobile or stationary computing device or system that implements data processing capabilities sufficient to provide a user interface, support connections to communication network 108, and implement the functionality ascribed to user system 120 herein. For example, in other implementations, user system 120 may take the form of a laptop computer, tablet computer, or smartphone, for example. User 124 may utilize user system 120 to interact with automated audio mapping system 100 to use audio mapping software code 110, executed by hardware processor 104, to produce mapped content file 148 corresponding to content 130.

It is noted that, in various implementations, mapped content file 148, when generated using audio mapping software code 110, may be stored in system memory 106 and/or may be copied to non-volatile storage. Alternatively, or in addition, as shown in FIG. 1, in some implementations, mapped content file 148 may be sent to mapped content file database 142 for storage, for example by being transferred via network communication links 128 of communication network 108. As another alternative, or additionally, mapped content file 148 may be transmitted via communication network 108 to user system 120 including display 122. It is further noted that display 122 may be implemented as a liquid crystal display (LCD), a light-emitting diode (LED) display, an organic light-emitting diode (OLED) display, or any other suitable display screen that performs a physical transformation of signals to light.

Figure 2:
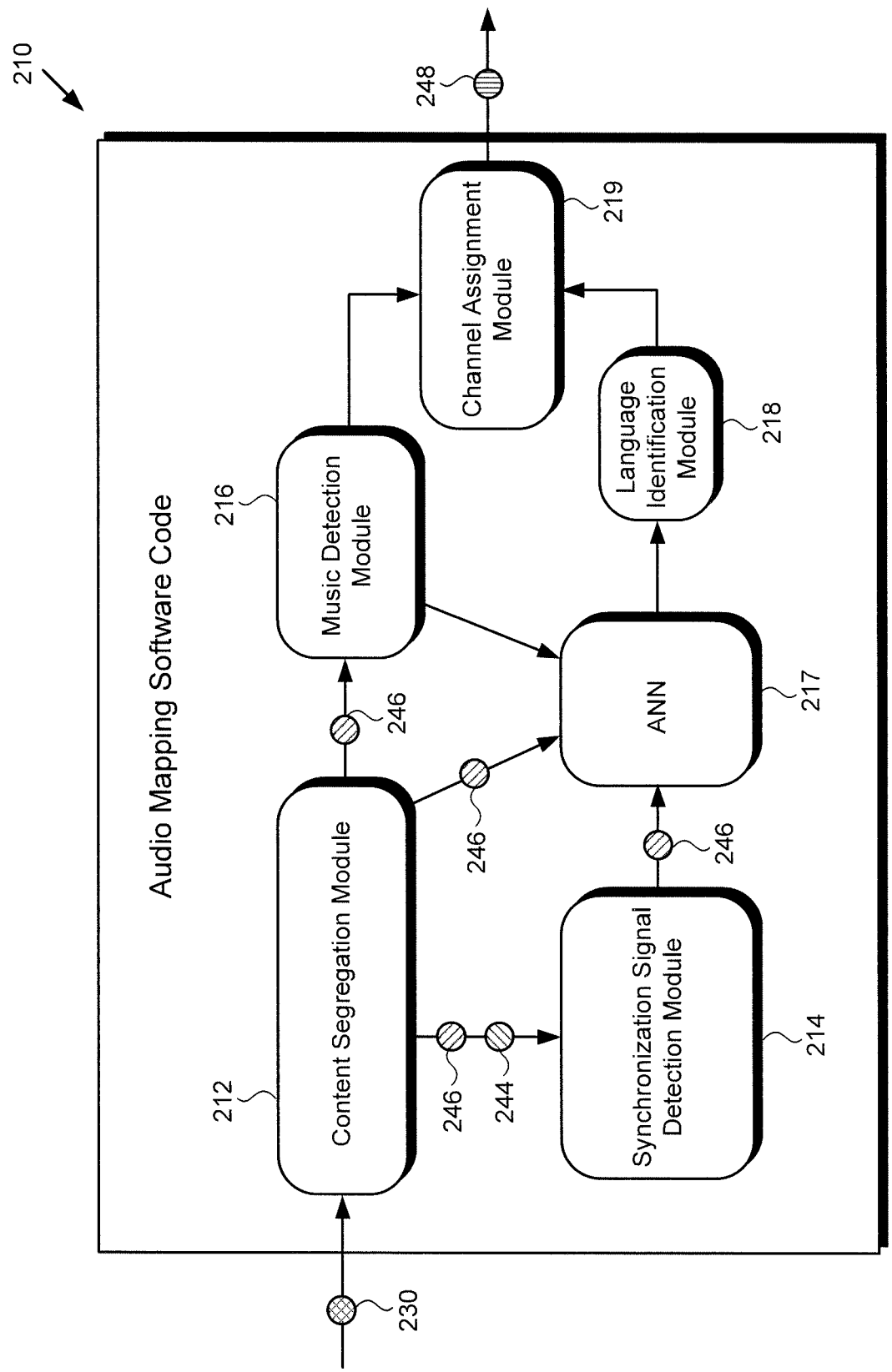
FIG. 2 shows an exemplary diagram of an audio mapping software code suitable for execution by a hardware processor of the system shown by FIG. 1, according to one implementation.

FIG. 2 shows exemplary audio mapping software code 210 suitable for execution by hardware processor 104 of computing platform 102, in FIG. 1, according to one implementation. As shown in FIG. 2, audio mapping software code 210 may include ANN 217. In addition, FIG. 2 shows content file or live stream 230 (hereinafter "content 230") and mapped content file 248 (generated using audio mapping software code 210 and corresponding to content 230).

As further shown in FIG. 2, audio mapping software code 210 can include content segregation module 212, synchronization signal detection module 214, music detection module 216, language identification module 218, and channel assignment module 219 providing mapped content file 248 corresponding to content 230 as an output. Also shown in FIG. 2 are multiple audio tracks 244 extracted from content 230 and audio spectrograms or other acoustic data 246 sampled from audio tracks 244.

Content 230 including audio tracks 244, and mapped content file 248, correspond respectively in general to content 130 including audio tracks 144, and mapped content file 148, in FIG. 1. As a result, content 230 and mapped content file 248 may share any of the characteristics attributed to respective content 130 and mapped content file 148 by the present disclosure, and vice versa. That is to say, like content 130, content 230 may take the form of an audio-visual file or live stream including video content 131 and metadata 132, in addition to audio tracks 244. Moreover, audio tracks 244 correspond in general to audio tracks 144 and those corresponding features may share any of the characteristics attributed to either feature by the present disclosure. Thus, like the audio tracks 144 included in content 130, audio tracks 244 may include respective left and right stereo music tracks 134a and 134b, dialog track 135, voice-over audio track 136, and audio special effects track 138.

Audio mapping software code 210 corresponds in general to audio mapping software code 110, and those corresponding features may share any of the characteristics attributed to either corresponding feature by the present disclosure. Thus, like audio mapping software code 210, audio mapping software code 110 may include an ANN corresponding to ANN 217, as well as features corresponding respectively to content segregation module 212, synchronization signal detection module 214, music detection module 216, language identification module 218, and channel assignment module 219.

Figure 3:
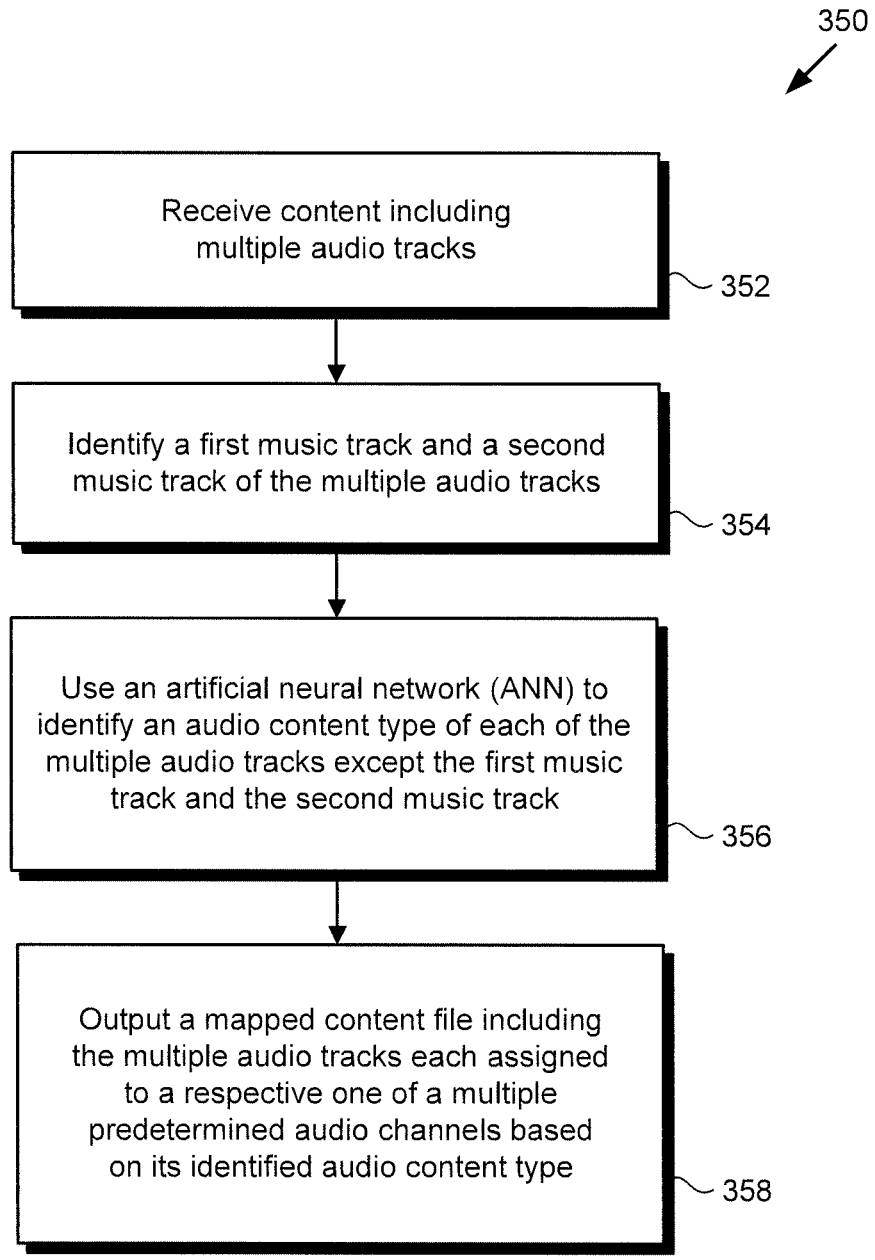
FIG. 3 shows a flowchart presenting an exemplary method for performing automated audio mapping using an ANN, according to one implementation.

The functionality of audio mapping software code 110/210 and ANN 217 will be further described by reference to FIG. 3 in combination with FIGS. 1 and 2. FIG. 3 shows flowchart 350 presenting an exemplary method for performing automated audio mapping using an ANN, according to one implementation. With respect to the method outlined in FIG. 3, it is noted that certain details and features have been left out of flowchart 350 in order not to obscure the discussion of the inventive features in the present application.

Referring to FIG. 3 in combination with FIGS. 1 and 2, flowchart 350 begins with receiving content 130/230 including multiple audio tracks 144/244 (action 352). By way of example, user 124 may utilize user system 120 to interact with automated audio mapping system 100 in order to produce mapped content file 148/248 corresponding to content 130/230. As shown by FIG. 1, in one implementation, user 124 may do so by transmitting content 130/230 from user system 120 to automated audio mapping system 100 via communication network 108 and network communication links 128. Alternatively, content 130/230 may be received from a third party source such as content provider 140, or may be stored in system memory 106. Content 130/230 may be received by audio mapping software code 110/210, executed by hardware processor 104.

As noted above, content 130/230 may be an audio-visual file or live stream including video content 131, metadata 132, and audio tracks 144/244 having synchronization signals 133. Moreover, and as also noted above, audio tracks 144/244 may include left and right stereo music tracks 134a and 134b, dialog track 135, voice-over audio track 136, and audio special effects track 138. Thus, in some implementations, action 352 may include extracting audio tracks 144/244 from content 130/230. In addition, in some implementations, action 352 may further include generating audio spectrograms or other acoustic data 246 corresponding respectively to each of audio tracks 144/244.

In some implementations, content 130/230 may include one or more empty audio tracks. In those implementations, action 352 may further include recognizing and discarding those empty audio tracks extracted from content 130/230. Extraction of audio tracks 144/244 from content 130/230, discarding of empty audio tracks, and generation of acoustic data 246 may be performed using content segregation module 212 of audio mapping software code 110/210, executed by hardware processor 104.

Flowchart 350 continues with identifying, without using ANN 217, a first music track and a second music track of audio tracks 144/244 (action 354). Referring to FIG. 1, action 354 corresponds to distinguishing left and right stereo music tracks 134a and 134b from dialog track 135, voice-over audio track 136, and audio special effects track 138. Identification of left and right stereo music tracks 134a and 134b may be based on a similarity between their respective acoustic characteristics with each other. For example, in use cases in which the first and second music tracks are left and right stereo music tracks of the same soundtrack, the acoustic characteristics of left and right stereo music tracks 134a and 134b may be expected to be more similar to one another than to any other audio tracks included among audio tracks 144/244.

In one implementation, left and right stereo music tracks 134a and 134b may be identified using acoustic fingerprinting, as known in the art, based on acoustic data 246. For example, left and right stereo music tracks 134a and 134b may be identified based on the correlation of acoustic fingerprinting of all of audio tracks 144/244. That is to say, the acoustic fingerprints of left and right stereo music tracks 134a and 134b will typically be highly correlated (e.g., more correlated to one another than to any of the other audio tracks 144/244). Identification of left and right stereo music tracks 134a and 134b may be performed by audio mapping software code 110/210, executed by hardware processor 104. Moreover, identification of left and right stereo music tracks 134a and 134b may be performed using music detection module 216 of audio mapping software code 110/210, and without using ANN 217.

It is noted that although action 354 refers specifically to identification of left and right stereo music tracks 134a and 134b, that description applies to the exemplary representation of audio tracks 144/244 shown in FIG. 1. However, as noted above, in some implementations, audio tracks 144/244 may include more than two audio tracks. In those implementations, action 354 may include identifying all music tracks included among audio tracks 144/244. By analogy to left and right stereo music tracks 134a and 134b, other music tracks included in audio tracks 144/244 may be present as left and right stereo pairs. As discussed above, the acoustic fingerprints of each pair of left and right stereo music tracks will typically be highly correlated (e.g., stereo music tracks that form a pair of left and right stereo music tracks are more correlated to one another than to any of the other audio tracks 144/244, including other stereo music tracks), thereby facilitating identification of those music tracks in action 354.

Flowchart 350 continues with identifying, using ANN 217, the audio content type of each of audio tracks 144/244 except left and right stereo music tracks 134a and 134b (action 356). As noted above by reference to action 354, identification of left and right stereo music tracks 134*a* and 134*b* may be performed by music detection module 216 of audio mapping software code 110/210, which may communicate that identification of left and right stereo music tracks 134*a* and 134*b* as such to ANN 217. As a result, ANN 217 need not perform an independent identification of the audio content type, i.e., music content, of left and right stereo music tracks 134*a* and 134*b*. Instead, ANN 217 may be used to identify dialog track 135, voice-over audio track 136, and audio special effects track 138 of audio tracks 144/244 as such.

By way of example, identification of dialog track 135, voice-over audio track 136, and audio special effects track 138 of audio tracks 144/244 may be performed by ANN 217 based on audio spectrograms of a predetermined length of an audio signal. It is noted that the predetermined length of audio signal may be a predetermined length such as several seconds, or longer. For example, in some implementations it may be advantageous or desirable to use audio spectrograms of approximately ten (10) second length audio signals included in acoustic data 246. However, in other implementations, audio signals having a predetermined length of greater than 10 seconds, such as 15 seconds or longer, may be used. ANN 217 can differentiate between human sounds, background sounds, sounds of things such as objects, and other source ambiguous sounds. It is noted that ANN 217 has previously been trained to distinguish among different audio content types. As a result, ANN 217 is trained to distinguish between dialog and voice-over content. In addition, ANN 217 is trained to distinguish among dialog, voice-over content, and audio special effects content.

For example, in one implementation, ANN 217 may be trained to identify the audio content of each of audio tracks 144/244 except left and right stereo music tracks 134*a* and 134*b* based on acoustic data 246 in the form of audio spectrograms sampled from audio tracks 144/244. As a specific example, each of audio tracks 144/244 not identified as music in action 354 may be divided into segments of 10 seconds duration (with 5 seconds of overlap for example), and ANN 217 determines one or more labels (e.g., human sound, background sounds such as environmental sounds, intervals of silence, sounds of things, and other source ambiguous sounds) for each segment.

It is noted that although music, when not synthesized, can be produced by one or more musical instruments and therefore may technically be a "sound of things," the acoustic characteristics of music is richer than the sound corresponding to a door closing, for example, or to an object being dropped. It is further noted that the specific reference to an overlap of audio track segments lasting 5 seconds is merely exemplary. More generally, the overlap interval can be any predetermined interval in a range from approximately 1 second to the predetermined length of the audio track segments themselves.

ANN 217 may determine a single label for some segments, but may determine multiple labels for others. For segments having multiple labels, ANN may further weight the labels. For example, a 10 second segment including 5 seconds of human sounds and 5 seconds of background sounds may be labeled "human sounds 0.5" and "background sounds 0.5." Once a label is determined for each of the segments, ANN 217 may make the following classifications:

An audio track of audio tracks 144/244 may be identified as voice-over audio track 136 if that audio track has the most segments labeled as "human sounds" when compared to other audio tracks 144/244, and includes few labels from the other categories, e.g., "background sounds", "sounds of things", and other source ambiguous sounds. As noted above, due to the isolation with which voice-over audio content is produced, there is a low expectation that voice-over audio track 136 will include significantly more than the voice-over narration and periods of silence. That is to say, in addition to determining labels corresponding to various affirmative sounds, ANN 217 may also be trained to label the absence of such sounds, i.e., intervals of silence.

An audio track of audio tracks 144/244 may be identified as dialog track 135 if most of the segments of that audio track are labeled "human sounds", while fewer of the segments are labeled as other categories. Dialog track 135 is expected to have fewer segments labeled "human sounds" than voice-over audio track 136. In addition, dialog track 135 is also expected to have more segments labeled "background sounds", "sounds of things", and other source ambiguous sounds than voice-over audio track 136. In some examples, dialog track 135 may have fewer intervals of silence than voice-over audio track 136.

An audio track of audio tracks 144/244 may be identified as audio special effects track 138 if the segments of that audio track carry a variety of different labels, and substantially fewer of the segments of that audio track are labeled as "human sounds" when compared to dialog track 135 and voice-over audio track 136.

As noted above, in some use cases, one or more of dialog track 135, voice-over audio track 136, and audio special effects track 138 may be omitted from audio tracks 144/244. Nevertheless, the criteria described above remain valid for identifying the audio content type of each of audio tracks 144/244. For example, the expectation that voice-over audio track 136 will include human sounds and silence, but almost no noise in the form of background sounds or sounds of things, while dialog track 135 is expected to include such noise enables identification of either one of dialog track 135 and voice-over audio track 136 when the other is omitted.

As an additional verification measure, the acoustic characteristics of presumptive dialog track 135, voice-over audio track 136, and audio special effects track 138 can be compared. For example, it may be expected that dialog track 135 and audio special effects track 138 will have more acoustic characteristics in common than voice-over audio track 136 and audio special effects track 138. The identification of the audio content type of each of audio tracks 144/244 except left and right stereo music tracks 134*a* and 134*b* using ANN 217 as described above may be performed by audio mapping software code 110/210, executed by hardware processor 104.

Although not included in the outline provided by flowchart 350, in some implementations, synchronization signals 133 included in audio tracks 144/244 may be detected and/or removed prior to action 356. In those implementations, hardware processor 104 may execute audio mapping software code 110/210 to use synchronization signal detection module 214 to detect synchronization signals 133 in audio tracks 144/244 except left and right stereo music tracks 134*a* and 134*b*, and to remove synchronization signals 133 from acoustic data 246 corresponding respectively to each of audio tracks 144/244 except left and right stereo music tracks 134*a* and 134*b*. However, in some implementations, it may be advantageous or desirable to remove synchronization signals 133 from acoustic data 246 corresponding to all of audio tracks 144/244, including left and right stereo music tracks 134*a* and 134*b*.

An example of synchronization signals 133 is the Society of Motion Picture and Television Engineers (SMPTE) signal. The SMPTE signal can be identified by using a notch filter centered at one kilohertz (1.0 KHz). The locations of synchronization signals 133 may be detected by filtering the audio tracks and comparing the filtered audio tracks to their respective unfiltered versions.

It is noted that, in some use cases, content 130/230 may include audio tracks 144/244 including speech in different languages. Moreover, in some such use cases, audio tracks 144/244 may include multiple different language versions of dialog track 135 and/or voice-over audio track 136. In those use cases, hardware processor 104 may execute audio mapping software code 110/210 to identify the language or languages in which speech included in audio tracks 144/244 is rendered. Thus, in some implementations, audio mapping software code 110/210 may utilize language identification module 218 to identify the one or more languages being spoken in dialog track or tracks 135 and voice-over audio track or tracks 136 identified by ANN 217. It is noted that language identification module 218 may be implemented as an ANN trained to receive audio from ANN 217 as an input, or may include a speech-to-text conversion component and may be configured to identify the spoken language based on the text.

Flowchart 350 may continue and conclude with outputting mapped content file 148/248 including audio tracks 144/244 each assigned to a respective one of multiple predetermined audio channels based on its identified audio content type (action 358).

It is noted that, in some implementations, automated audio mapping system 100 may govern the ingestion of content 130/230 coming from post-production houses corresponding to content provider 140 by another content management system (not shown in the present figures). In those implementations, if the audio layout of content 130/230 is correct, or has been corrected by automated audio mapping system 100, content 130/230 is ingested by the content management system. However, if automated content management system 100 is unable to identify some of audio tracks 144/244, content 130/230 may be flagged for review or analysis by a human operator. That is to say, failure to generate mapped content file 148/248 corresponding to content 130/230 would raise a red flag to the live operations team to correct the audio layout. By contrast, when automated audio mapping system successfully generates and outputs mapped content file 148/248, corresponding content 130/230 can be ingested into the content management system.

Figure 4:
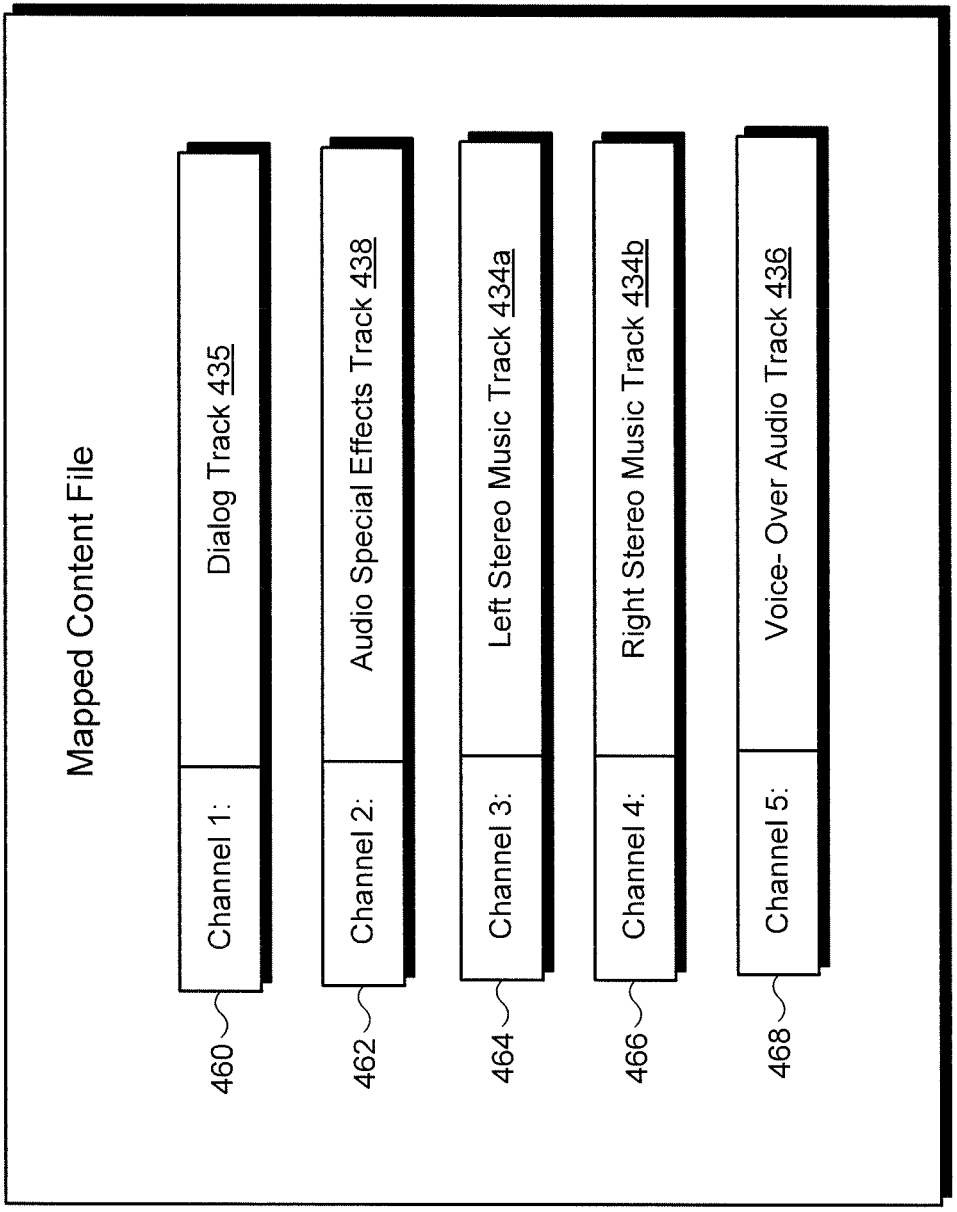
FIG. 4 shows an exemplary mapped content file including predetermined audio channels to which audio tracks have been assigned.

Referring to FIG. 4, FIG. 4 shows exemplary mapped content file 448 including predetermined audio channels 460, 462, 464, 466, and 468 to which audio tracks 144/244 of content 130/230 have been assigned. It is noted that audio channel number one (hereinafter "channel 460") is a predetermined dialog channel, while audio channel number two (hereinafter "channel 462") is a predetermined audio special effects channel. It is further noted that audio channels number three and four (hereinafter "channel 464" and "channel 466", respectively) are predetermined left and right stereo music channels, while audio channel number five (hereinafter "channel 468") is a predetermined voice-over channel. Also shown in FIG. 4 are left and right stereo music tracks 434a and 434b, dialog track 435, voice-over audio track 436, and audio special effects track 438.

Mapped content file 448 corresponds in general to mapped content file 148/248 in FIGS. 1 and 2. As a result, mapped content file 148/248 may share any of the characteristics attributed to mapped content file 448 by the present disclosure, and vice versa. That is to say, like mapped content file 448, mapped content file 148/248 may include features corresponding respectively to predetermined dialog channel 460, predetermined audio special effects channel 462, predetermined left and right stereo music channels 464 and 466, and predetermined voice-over channel 468.

Moreover, left and right stereo music tracks 434a and 434b, dialog track 435, voice-over audio track 436, and audio special effects track 438 correspond respectively in general to left and right stereo music tracks 134a and 134b, dialog track 135, voice-over audio track 136, and audio special effects track 138, in FIG. 1, and correspond collectively to audio tracks 144/244 in FIG. 2. Thus, left and right stereo music tracks 434a and 434b, dialog track 435, voice-over audio track 436, and audio special effects track 438 may share any of the characteristics attributed to audio tracks 144/244, as well as to respective left and right stereo music tracks 134a and 134b, dialog track 135, voice-over audio track 136, and audio special effects track 138, by the present disclosure, and vice versa.

As shown in FIG. 4, audio track 135/435 of audio tracks 144/244, identified as dialog track 135/435 using ANN 217 in action 356, is assigned to predetermined dialog channel 460. Analogously, audio track 138/438 identified as audio special effects track 138/438 using ANN 217 is assigned to predetermined audio special effects channel 462, and audio track 136/436 identified as voice-over audio track 136/436 using ANN 217 is assigned to predetermined voice-over channel 468. In addition, and as further shown in FIG. 4, audio tracks 134a/434a and 134b/434b identified, without using ANN 217, as respective left and right stereo music tracks 134a/434a and 134b/434b in action 354 are assigned to respective predetermined left and right stereo music channels 464 and 466.

Action 358 may be performed by audio mapping software code 110/210, executed by hardware processor 104, and using channel assignment module 219. As noted above, in some use cases, mapped content file 148/248/448 may be output by audio mapping software code 110/210 for storage in system memory 106 and/or may be copied to non-volatile storage. Alternatively, or in addition, in some use cases, mapped content file 148/248/448 may be output to mapped content file database 142 for storage, for example by being transmitted via network communication links 128 of communication network 108.

As another alternative, or additionally, and as also noted above, mapped content file 148/248/448 may be transmitted via communication network 108 to user system 120 including display 122. Although not included in flowchart 350, in some implementations in which mapped content file 148/248/448 is output to user system 120, the present method can include rendering the mapping shown in FIG. 4 on display 122 of user system 120. As noted above, display 122 may be implemented as an LCD, LED display, or an OLED display, for example.

It is noted that, in some implementations, user system 120 including display 122 may be integrated with automated audio mapping system 100 such that display 122 may be controlled by hardware processor 104 of computing platform 102. In other implementations, as noted above, audio mapping software code 110/210 including ANN 217 may be stored on a computer-readable non-transitory medium, and may be accessible to the hardware processing resources of user system 120. In those implementations, the rendering of mapped content file 148/248/448 on display 122 may be performed by audio mapping software code 110/210, executed either by hardware processor 104 of computing platform 102, or by a hardware processor of user system 120.

Although also not included in the outline provided by flowchart 350, in some implementations it may be advantageous or desirable to test or otherwise evaluate the alignment of one or more of left and right stereo music tracks 134a/434a and 134b/434b, dialog track 135/435, voice-over audio track 136/436, and audio special effects track 138/438 with video content 131 included in content 130/230. For example, timecode data included in video content 131 may be compared with timecode information included in one or more of left and right stereo music tracks 134a/434a and 134b/434b, dialog track 135/435, voice-over audio track 136/436, and audio special effects track 138/438 with video content 131 included in content 130/230. Alternatively, or in addition, in some implementations, metadata 132 included in content 130/230 may be used to test the alignment of one or more of left and right stereo music tracks 134a/434a and 134b/434b, dialog track 135/435, voice-over audio track 136/436, and audio special effects track 138/438 with video content 131.

Thus, the present application discloses automated systems and methods for performing audio mapping using an ANN that overcome the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An automated audio mapping system comprising:
   a computing platform including a hardware processor and a system memory;
   an audio mapping software code stored in the system memory, the audio mapping software code including an artificial neural network (ANN) trained to identify a plurality of different audio content types;
   the hardware processor configured to execute the audio mapping software code to:
      receive a content including a plurality of audio tracks;
      identify, without using the ANN, a first music track and a second music track of the plurality of audio tracks;
      identify, using the ANN, an audio content type of each of the plurality of audio tracks except the first music track and the second music track; and
      output a mapped content file including the plurality of audio tracks each assigned to a respective one of a plurality of predetermined audio channels based on its identified audio content type.

2. The automated audio mapping system of claim 1, wherein the first music track and the second music track are identified based on a similarity between their respective acoustic characteristics with each other.

3. The automated audio mapping system of claim 1, wherein the first music track and the second music track are identified using acoustic fingerprinting.

4. The automated audio mapping system of claim 1, wherein the hardware processor is configured to execute the audio mapping software code to:
   detect a synchronization signal in the plurality of audio tracks; and
   remove the synchronization signal from acoustic data corresponding respectively to each of the plurality of audio tracks.

5. The automated audio mapping system of claim 1, wherein the hardware processor is configured to further execute the audio mapping software code to identify a language spoken in at least one of a dialog track or a voice-over audio track of the plurality of audio tracks.

6. The automated audio mapping system of claim 1, wherein the ANN is trained to distinguish among dialog, voice-over content, and audio special effects content.

7. The automated audio mapping system of claim 6, wherein the audio special effects content includes at least one of background sounds, a laugh track, or applause.

8. The automated audio mapping system of claim 1, wherein the received content comprises an audio-visual content including video, and wherein the hardware processor is configured to execute the audio mapping software code to extract the plurality of audio tracks from the audio-visual content.

9. The automated audio mapping system of claim 8, wherein the hardware processor is configured to execute the audio mapping software code to test an alignment of at least one of the assigned audio tracks of the mapped content file with the video of the audio-visual content based on one or more of the video and metadata included in the received content.

10. The automated audio mapping system of claim 1, wherein the ANN is trained to identify the audio content type of each of the plurality of audio tracks except the first music track and the second music track based on a plurality of audio spectrograms sampled from the plurality of audio tracks.

11. A method for use by an automated audio mapping system including a computing platform having a hardware processor and a system memory storing an audio mapping software code including an artificial neural network (ANN) trained to identify a plurality of different audio content types, the method comprising:
   receiving, by the audio mapping software code executed by the hardware processor, a content including a plurality of audio tracks;
   identifying, by the audio mapping software code executed by the hardware processor and without using the ANN, a first music track and a second music track of the plurality of audio tracks;
   identifying, by the audio mapping software code executed by the hardware processor and using ANN, an audio content type of each of the plurality of audio tracks except the first music track and the second music track; and
   outputting, by the audio mapping software code executed by the hardware processor, a mapped content file including the plurality of audio tracks each assigned to a respective one of a plurality of predetermined audio channels based on its identified audio content type.

12. The method of claim 11, wherein the first music track and the second music track are identified based on a similarity between their respective acoustic characteristics with each other.

13. The method of claim 11, wherein the first music track and the second music track are identified using acoustic fingerprinting.

14. The method of claim 11, wherein the method further comprises:
   detecting, by the audio mapping software code executed by the hardware processor, a synchronization signal in the plurality of audio tracks; and
   removing, by the audio mapping software code executed by the hardware processor, the synchronization signal from acoustic data corresponding respectively to each of the plurality of audio tracks.

15. The method of claim 11, further comprising identifying, by the audio mapping software code executed by the hardware processor, a language spoken in at least one of a dialog track or a voice-over audio track of the plurality of audio tracks.

16. The method of claim 11, wherein the ANN is trained to distinguish among dialog, voice-over content, and audio special effects content.

17. The method of claim 16, wherein the audio special effects content includes at least one of background sounds, a laugh track, or applause.

18. The method of claim 11, wherein the received content comprises an audio-visual content including video, and wherein the method further comprises extracting, by the audio mapping software code executed by the hardware processor, the plurality of audio tracks from the audio-visual content.

19. The method of claim 18, wherein the method further comprises testing an alignment of at least one of the assigned audio tracks of the mapped content file with the video of the audio-visual file, by the audio mapping software code executed by the hardware processor, based on one or more of the video and metadata included in the received content.

20. The method of claim 11, wherein the ANN is trained to identify the audio content type of each of the plurality of audio tracks except the first music track and the second music track based on a plurality of audio spectrograms sampled from the plurality of audio tracks.

\* \* \* \* \*